US008032660B2

(12) United States Patent
Sahita et al.

(10) Patent No.: US 8,032,660 B2
(45) Date of Patent: Oct. 4, 2011

(54) APPARATUS AND METHOD FOR MANAGING SUBSCRIPTION REQUESTS FOR A NETWORK INTERFACE COMPONENT

(75) Inventors: Ravi Sahita, Beaverton, OR (US); David Durham, Beaverton, OR (US); Arun Raghunath, Beaverton, OR (US); Raj K. Ramanujan, Federal Way, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 12/317,896

(22) Filed: Dec. 30, 2008

(65) Prior Publication Data

US 2010/0169507 A1 Jul. 1, 2010

(51) Int. Cl.
*G06F 15/16* (2006.01)
(52) U.S. Cl. ........ 709/250; 709/229; 709/227; 709/220; 709/224; 725/34; 725/35; 370/254; 370/390; 370/252
(58) Field of Classification Search .................. 709/250, 709/203, 214, 217
See application file for complete search history.

(56) References Cited

U.S. PATENT DOCUMENTS

| | | | |
|---|---|---|---|
| 7,072,958 B2 | 7/2006 | Parmar | |
| 7,254,133 B2 | 8/2007 | Govindarajan | |
| 7,424,711 B2 | 9/2008 | Schluessler | |
| 7,440,461 B2 | 10/2008 | Sahita | |
| 7,441,272 B2 | 10/2008 | Durham | |
| 7,443,854 B2 | 10/2008 | Sahita | |
| 7,467,285 B2 | 12/2008 | Khosravi | |
| 7,483,423 B2 | 1/2009 | Grewal | |
| 7,512,768 B2 | 3/2009 | Gutti | |
| 7,536,479 B2 | 5/2009 | Sahita | |
| 7,536,674 B2 | 5/2009 | Jason | |
| 7,548,944 B2 | 6/2009 | Sahita | |
| 7,558,966 B2 | 7/2009 | Durham | |
| 7,571,298 B2 | 8/2009 | Khosravi | |
| 7,594,269 B2 | 9/2009 | Durham | |
| 7,624,242 B2 | 11/2009 | Savagaonkar | |
| 7,669,242 B2 | 2/2010 | Sahita | |
| 7,684,400 B2 | 3/2010 | Govindarajan | |
| 7,689,305 B2 * | 3/2010 | Kreifeldt et al. | ................ 700/94 |
| 7,703,126 B2 | 4/2010 | Khosravi | |
| 7,725,573 B2 | 5/2010 | Raghunath | |
| 7,739,517 B2 | 6/2010 | Sahita | |
| 7,739,724 B2 | 6/2010 | Durham | |
| 7,748,037 B2 | 6/2010 | Rajagopal | |
| 7,757,035 B2 | 7/2010 | Durham | |
| 7,761,674 B2 | 7/2010 | Durham | |

(Continued)

OTHER PUBLICATIONS

Office Action Received for Korean Patent Application No. 10-2009-129601, mailed on Mar. 11, 2011, 3 pages of Office Action and 2 pages of English Translation.

(Continued)

*Primary Examiner* — Jude Jean Gilles
(74) *Attorney, Agent, or Firm* — Paul E. Steiner

(57) ABSTRACT

In some embodiments, a processor-based system may include at least one processor, at least one memory coupled to the at least one processor, a network interface component, and a management controller. The management controller may be configured to receive information related to a subscription request for a virtual machine, generate configuration information for the network interface component based on the subscription request, and provide the configuration information to the network interface component. Other embodiments are disclosed and claimed.

18 Claims, 6 Drawing Sheets

U.S. PATENT DOCUMENTS

| | | |
|---|---|---|
| 7,797,749 B2 | 9/2010 | Rajagopal |
| 7,802,050 B2 | 9/2010 | Savagaonkar et al. |
| 2002/0025781 A1* | 2/2002 | Saito .............................. 455/41 |
| 2006/0206300 A1 | 9/2006 | Garg |
| 2007/0079307 A1 | 4/2007 | Dhawan et al. |
| 2008/0059811 A1 | 3/2008 | Sahita |
| 2008/0163207 A1 | 7/2008 | Reumann |
| 2008/0208931 A1 | 8/2008 | Van Riel et al. |
| 2008/0209415 A1 | 8/2008 | Van Riel |
| 2009/0172328 A1 | 7/2009 | Sahita |
| 2009/0172663 A1 | 7/2009 | Sahita |
| 2009/0172822 A1 | 7/2009 | Sahita |
| 2009/0327648 A1 | 12/2009 | Savagaonkar |
| 2010/0077018 A1* | 3/2010 | Acharya et al. ............... 709/203 |

OTHER PUBLICATIONS

European Office Action received Oct. 26, 2010 for EP application No. 09252868.6, mailed Oct. 13, 2010, 9 pages.

* cited by examiner

APPARATUS AND METHOD FOR MANAGING SUBSCRIPTION REQUESTS FOR A NETWORK INTERFACE COMPONENT

TECHNICAL FIELD

The invention relates to virtual machines. More particularly, some embodiments of the invention relate to an apparatus and method for managing subscription requests for a network interface component.

BACKGROUND AND RELATED ART

Virtualization technology may enable a single system to run multiple guest operating systems in virtual machines (VMs). Such VMs may communicate with each other and other physical machines via standard networking protocols such as TCP/IP. Some systems may provide a network appliance in a VM. Such VM-based network appliances may be referred to as virtual inline network appliances (VINA).

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
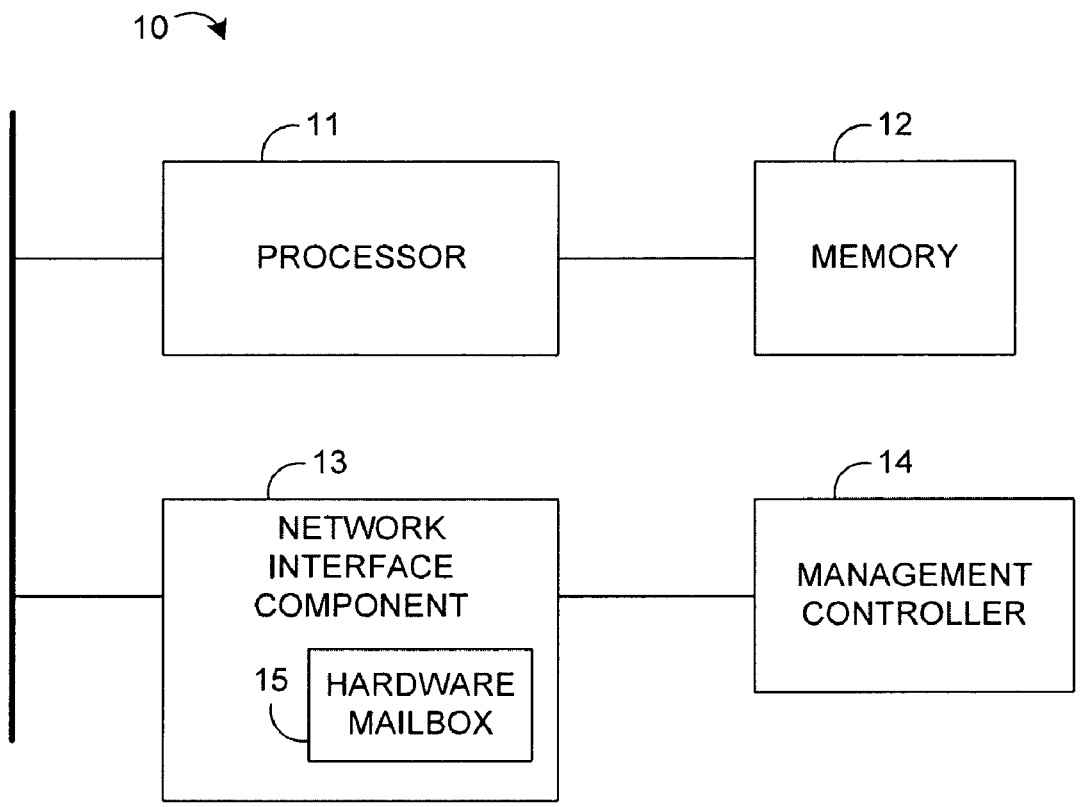
FIG. 1 is a block diagram of an electronic system in accordance with some embodiments of the invention.

With reference to FIG. 1, a processor-based system 10 in accordance with some embodiments of the invention may include at least one processor 11, at least one memory 12 coupled to the at least one processor 11, a network interface component (NIC) 13, and a management controller 14. For example, the management controller 14 may be configured to receive information related to a subscription request for a virtual machine, generate configuration information for the network interface component 13 based on the subscription request, and provide the configuration information to the network interface component 13. For example, the virtual machine may include a virtual inline network appliance and the virtual inline network appliance may directly issue the subscription request (e.g. to the management controller 14). In some embodiments of the invention, the system 10 may include a plurality of virtual inline network appliances and the management controller 14 may be configured to receive subscription requests from the plurality of virtual inline network appliances, generate a filter configuration for the network interface component 13 based on all the subscription requests received from the plurality of virtual inline network appliances, and apply the filter configuration to the network interface component 13.

For example, the network interface component 13 may includes a hardware mailbox 15 and the management controller 14 may provide the configuration information to the network interface component 13 via the hardware mailbox 15. In some embodiments of the invention, the management controller 14 may provide the configuration information to the network interface component via a network protocol.

For example, in some embodiments of the invention a subscription request may correspond to a configuration bit set for a virtual function configuration. For example, the configuration bit may be set by a basic input output system (BIOS). For example, is some embodiments of the invention the management controller 14 may be further configured to migrate information related to the configuration of the network interface component 13 if the virtual machine is moved. For example, the migration may be performed in response to a signal from an external switch.

Figure 2:
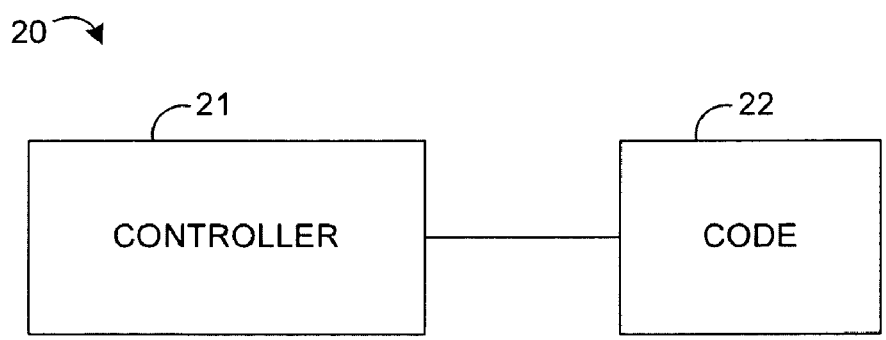
FIG. 2 is a block diagram of a management controller in accordance with some embodiments of the invention.

With reference to FIG. 2, a management controller 20 may include a controller 21 and code 22, wherein when the code 22 is executed by the controller 21 the management controller 20 is configured to receive information related to a subscription request for a virtual machine, generate configuration information for a network interface component based on the subscription request, and provide the configuration information to the network interface component. For example, the controller 21 may be a micro-controller (e.g. including a special purpose processor). For example, the code 22 may include firmware stored in a memory. For example, the memory may be disposed on a same integrated circuit as the controller 21.

For example, in some embodiments of the invention, the virtual machine may include a virtual inline network appliance and the virtual inline network appliance may directly issue the subscription request. For example, the management controller 20 may be configured to receive subscription requests from a plurality of virtual inline network appliances, generate a filter configuration for the network interface component based on all the subscription requests received from the plurality of virtual inline network appliances, and apply the filter configuration to the network interface component.

For example, in some embodiments of the invention, the network interface component may include a hardware mailbox and the management controller 20 may provide the configuration information to the network interface component via the hardware mailbox. For example, in some embodiments of the invention the management controller 20 may provide the configuration information to the network interface component via a network protocol.

For example, in some embodiments of the invention, a subscription request may correspond to a configuration bit set for a virtual function configuration. For example, the configuration bit may be set by a basic input output system (BIOS). For example, in some embodiments of the invention, the management controller 20 may be further configured to migrate information related to the configuration of the network interface component if the virtual machine is moved. For example, the migration may be performed in response to a signal from an external switch.

Figure 3:
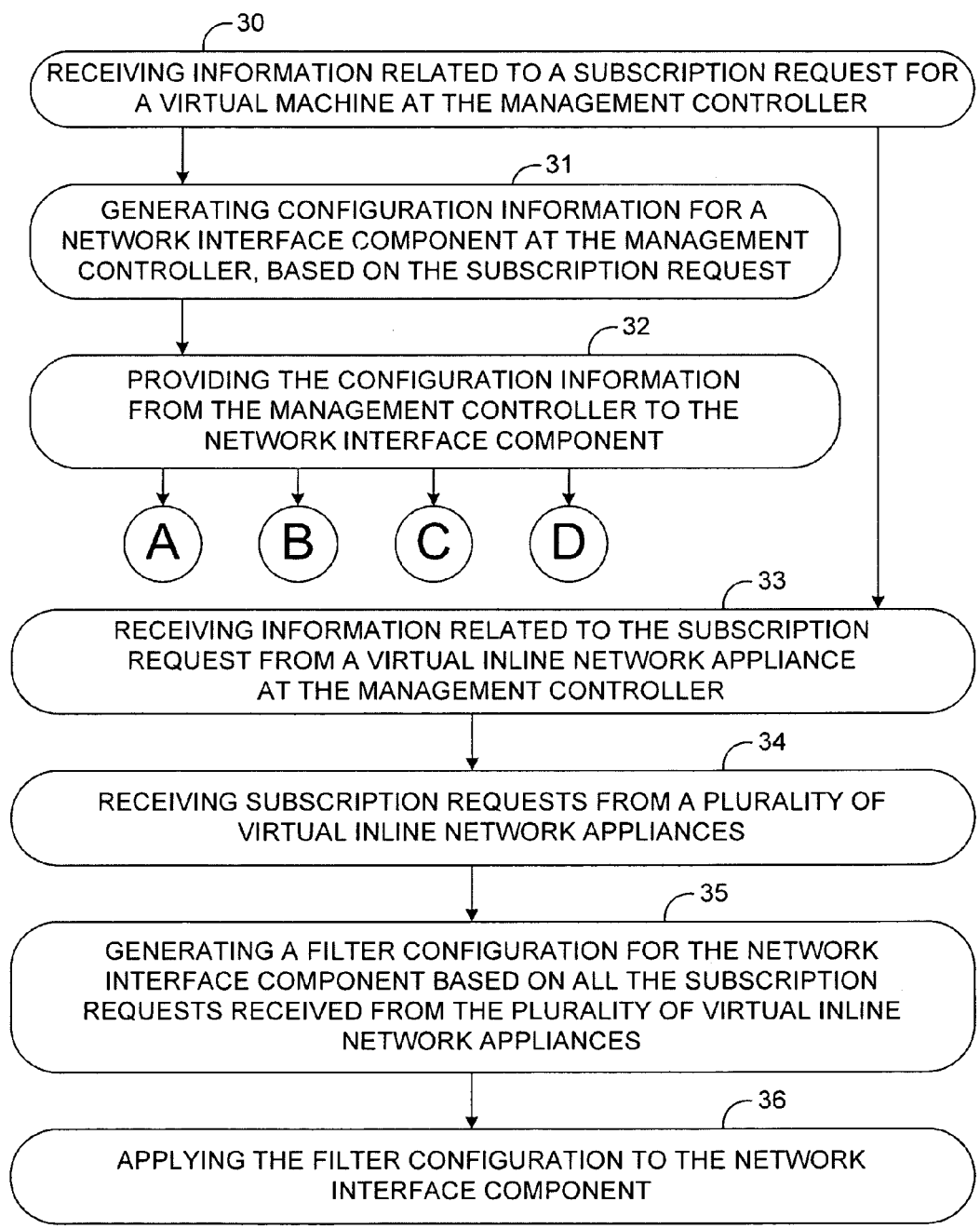
FIG. 3 is a flow diagram in accordance with some embodiments of the invention.

With reference to FIG. 3, in accordance with some embodiments of the invention a method of managing subscription requests for a network interface component may include receiving information related to a subscription request for a virtual machine at the management controller (e.g. at block 30), generating configuration information for a network interface component at the management controller, based on the subscription request (e.g. at block 31), and providing the configuration information from the management controller to the network interface component (e.g. at block 32). For example, receiving information related to a subscription request may include receiving information related to the subscription request from a virtual inline network appliance at the management controller (e.g. at block 33). Some embodiments of the invention may further include receiving subscription requests from a plurality of virtual inline network appliances (e.g. at block 34), generating a filter configuration for the network interface component based on all the subscription requests received from the plurality of virtual inline network appliances (e.g. at block 35), and applying the filter configuration to the network interface component (e.g. at block 36).

Figure 4:
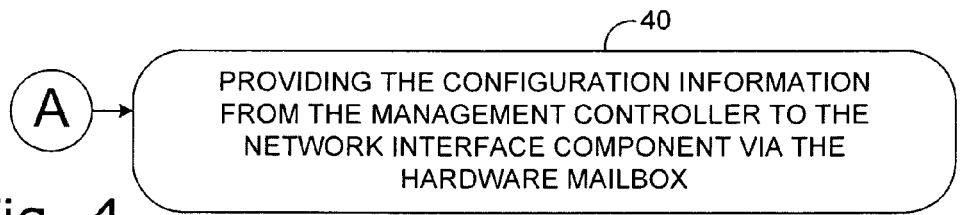
FIG. 4 is another flow diagram in accordance with some embodiments of the invention.

With reference to FIG. 4, in some embodiments of the invention the network interface component may include a hardware mailbox and providing the configuration information from the management controller to the network interface component may include providing the configuration information from the management controller to the network interface component via the hardware mailbox (e.g. at block 40).

Figure 5:
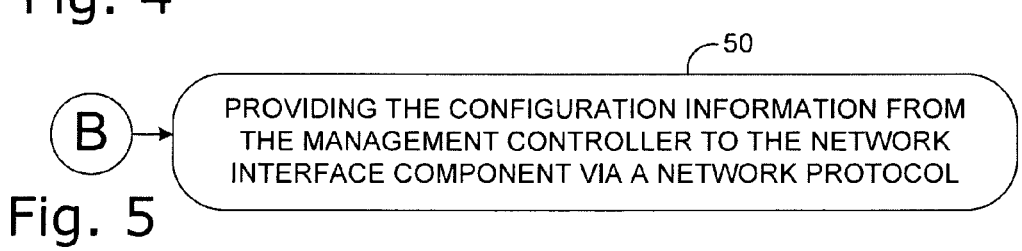
FIG. 5 is another flow diagram in accordance with some embodiments of the invention.

With reference to FIG. 5, in some embodiments of the invention providing the configuration information from the management controller to the network interface component may include providing the configuration information from the management controller to the network interface component via a network protocol (e.g. at block 50).

Figure 6:
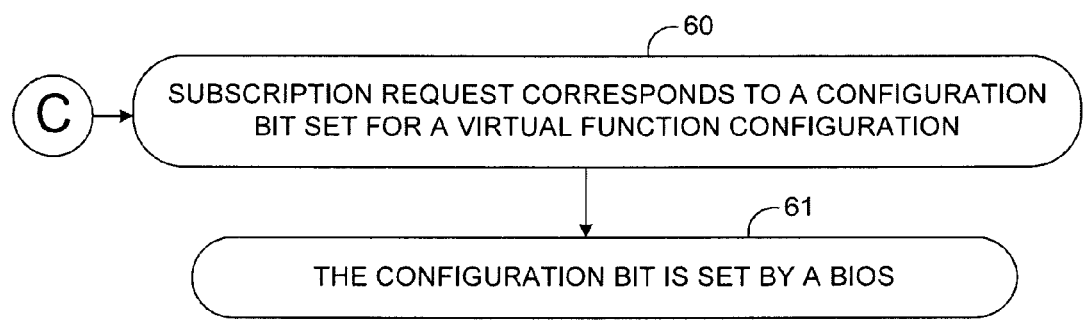
FIG. 6 is another flow diagram in accordance with some embodiments of the invention.

With reference to FIG. 6, in some embodiments of the invention a subscription request may correspond to a configuration bit set for a virtual function configuration (e.g. at block 60). For example, the configuration bit may be set by a basic input output system (e.g. at block 61).

Figure 7:
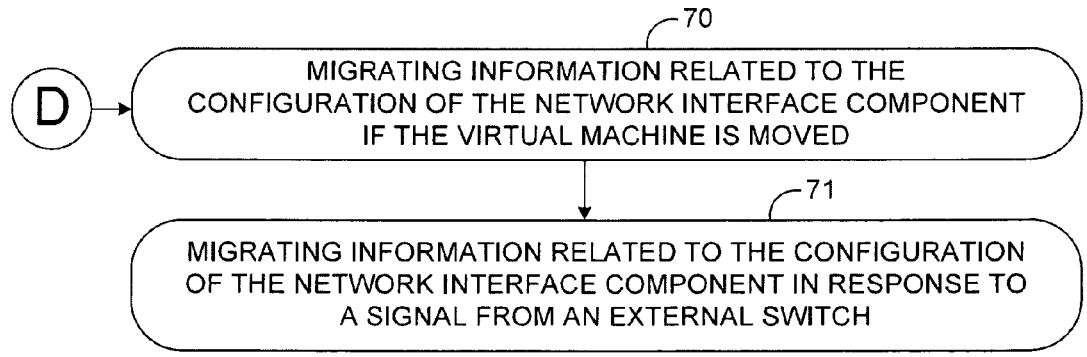
FIG. 7 is another flow diagram in accordance with some embodiments of the invention.

With reference to FIG. 7, some embodiments of the invention may further include migrating information related to the configuration of the network interface component if the virtual machine is moved (e.g. at block 70). For example, migrating information related to the configuration of the network interface component may include migrating information related to the configuration of the network interface component in response to a signal from an external switch (e.g. block 71).

Some embodiments of the invention may find utility with virtualization technology, network inspection, and/or high speed network protocols such as 10 gigabit Ethernet. For example, some applications of virtualization technology may enable a single server to run multiple guest operating systems in virtual machines (VMs). Such VMs can communicate with each other and other physical machines via standard networking protocols such as TCP/IP. For efficiency reasons, it may be desirable that the inter-VM communication does not enter the rest of the data-center. However, for data-center security, it also may be necessary or desirable to monitor the inter-VM traffic (e.g. with a VINA).

For example, a VINA may inject itself into the middle of a inter-VM communication to be inspected. For example, a Virtual Machine Monitor (VMMs) may use a network Input Output Virtual Machine (IOVM) model to expose virtual NICs to the Guest VMs. All VM to VM communication may passes through one logical entity on the platform, namely the IOVM, which can then route packets to the security appliances. The security appliances have to subscribe to packet types through a configuration interface which may differ from VMM to VMM.

In another example, a platform may have a Single Root Input Output Virtualization (SR-IOV) capable NIC. With SR-IOV, the VMM does not have to expose virtual NICs to the VMs. Instead, the VMM may expose a Virtual Function (VF) which is a virtualized hardware queue that can be directly controlled by the VM. In this case, if a VM has VINA functionality, the VM must still subscribe through a VMM-provided API/interface which then configures the filters via a NIC Physical Function (PF) that is controlled by the VMM. The VMM (or driver VM) provides an API to allow the VINA to subscribe for packets and packet events. The hypervisor then configures the NIC Physical Function based on collating requests from the various registered inline appliance.

Advantageously, some embodiments of the invention may provide a hardware-oriented method of configuring an SR-IOV capable NIC such that VI NA's can directly subscribe to packet flows without depending on a VMM-provided interface. Advantageously, some embodiments of the invention may decrease the enabling required and/or increase the security of the configuration approach by isolating the configuration code into micro-controller firmware. Advantageously, some embodiments of the invention may also allow physical network appliances to interact with a VINA-enabled platform such that when a VM is moved from one server to another, the physical appliance can move the security policies from the network switch to the NIC via a configuration interface to a management micro-controller.

Figure 8:
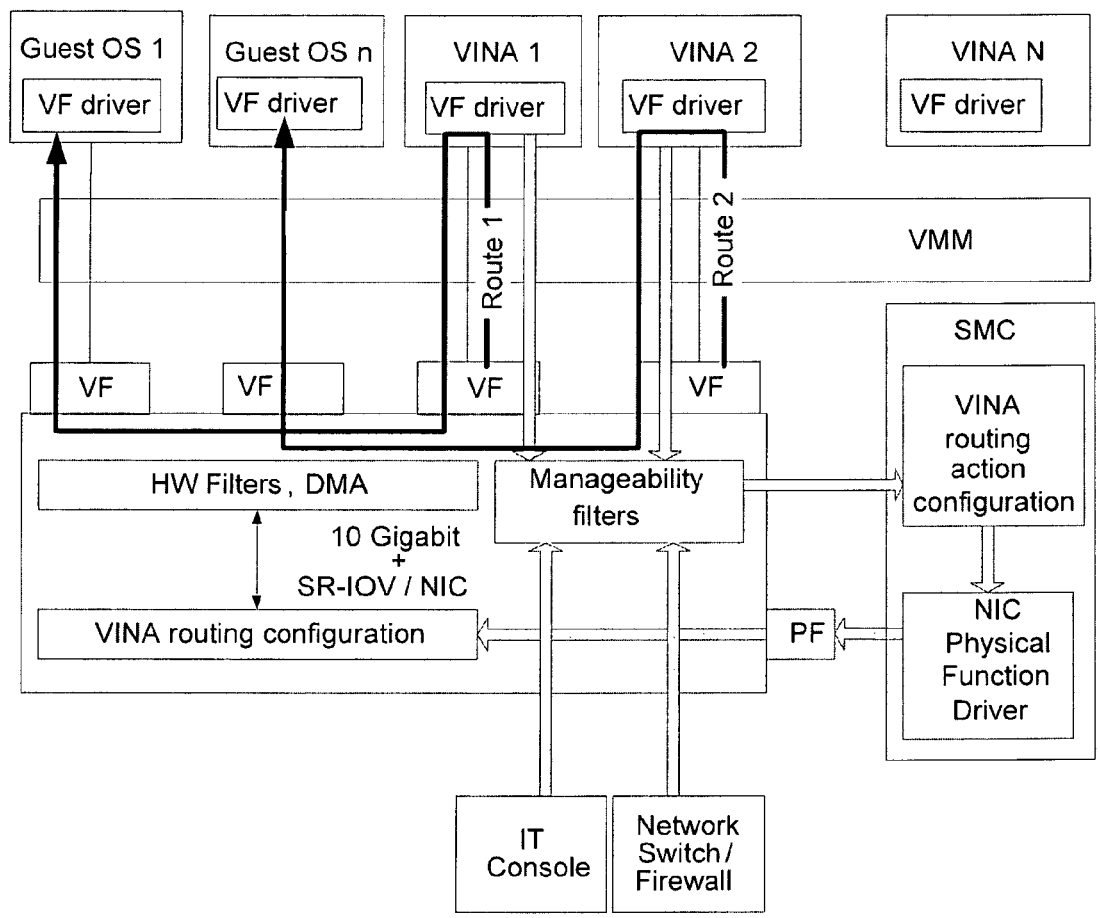
FIG. 8 is a block diagram of another electronic system in accordance with some embodiments of the invention.

With reference to FIG. 8, a server platform may include a two or more Guest OS's (e.g. numbered 1 through n), two or more VINAs (e.g. numbered 1 through N), a VMM, a NIC including two or more VFs and a PF, and an SMC coupled to the NIC. The NIC may also be connected to an IT console and a network switch/firewall. For example, in some embodiments of the invention, the VINAs that want to receive specific packets or flows may issue a subscription for these packets types. These subscription messages may be sent via the virtual function (channel) that is assigned to the VINA by the VMM. The subscription messages may then be routed to a System Management Controller (SMC) using hardware filters on the network interface. For example, the VINA may choose its filter configuration through the SMC. For example, the SMC may be a micro-controller that may be used to manage system devices on the platform via internal buses. The SMC may also have a network stack that allows it to communicate with devices outside the platform and management consoles that can securely configure the devices on the platform through the SMC.

In some embodiments of the invention, the SMC may receive subscriptions from all the VINA's present on the platform and may generate the final filter configuration that is applied to the NIC via the physical function (e.g. or via internal management buses that only the SMC can access). For example, route 1 and route 2 in FIG. 8 may correspond to two sample routing configurations that are created by the SMC.

For example, in some embodiments of the invention a VINA may explicitly subscribe for packets to be sent to it. For example, there may be various levels of dynamic configuration possible. In a simple example configuration, a VINA may request all packets to be sent to it via its particular virtual function. In an advanced example configuration, the VINA may request only certain types of packets be sent to it by issuing filter configuration.

Advantageously, some embodiments of the invention may provide a direct hardware implementation for the NIC to allow direct configuration. For example, in some embodiments of the invention a VF-PF hardware mailbox may be utilized to send configuration requests to the NIC. For example, the hardware mailbox be provided on an SR-IOV capable NIC. For example, in some embodiments of the invention, a network protocol may be utilized to exchange information between the SMC and the NIC on the platform. The NIC can then configure the filters based on the information received from the SMC corresponding the VINA subscriptions.

For example, an in-band configuration method can be supported by using filters in the NIC to redirect traffic to the SMC as follows. The SMC programs a reserved port and L3 destination address into the MNG filters field in the NIC HW. The VMM direct assigns (via VT-d) a NIC VF to an inline appliance VM. On startup, the VINA connects to it's management service to securely obtain it's subscription rules and the reserved port, L3/L4 destination address to use for secure configuration of the NIC for appliance operation. The appliance may also be statically configured with the reserved port and L3/L4 address to use. On startup, the SMC configures the NIC filters to route traffic that originates from the local platform and matches this criteria to be routed to the SMC. The VINA may also get the necessary security credentials (for example certificates or shared keys) to mutually authenticate with the SMC so that it can ensure that it is configuring a VINA-capable platform NIC, and the SMC can authenticate that the VINA is authorized to configure the routing of inter-VM traffic on the platform. In case, a VINA is migrated, it may repeat this operation for the new NIC on the destination hardware platform it was migrated to.

The VINA may then prepare packets containing the network filter configuration with the subscription for the packet it desires to inspect and transmit the configuration packet to the reserved port and destination address via the virtual function assigned to it by the VMM. These subscription packets are routed to the SMC, which collects the subscription information from all VINAs before it generates the final filter list for the NIC. The SMC programs the NIC via the direct configuration interface to the NIC. If a VINA updates or deletes a filter via a subscription update message, the SMC may need to update more than one filter to reflect the change the subscription has on other routes. Additionally the SMC firmware may combine and collapse filters for duplicate configurations from VINAs and may detect and report conflicts (if rules cannot be collapsed or priority conflicts exist) back to the management console or a control VM on the platform.

Advantageously, a malicious VM will not have access to the security credentials, the reserved port (16 bit) and IPv4 or IPv6 L3/L4 address (32 or 128 bits) because the manageability filtered traffic will not be forwarded to the host (or the VMM).

In some embodiments of the invention, an implicit subscription request and configuration may be performed by system software such as BIOS to enable a VF to be used for VINA functionality. For example, the subscription may be made by setting a configuration bit for the Virtual Function configuration. For example, when the VF is identified as VINA-enabled, the implication may be that the VINA is added to the NIC routing configuration so that traffic flows to the VINA.

Figure 9:
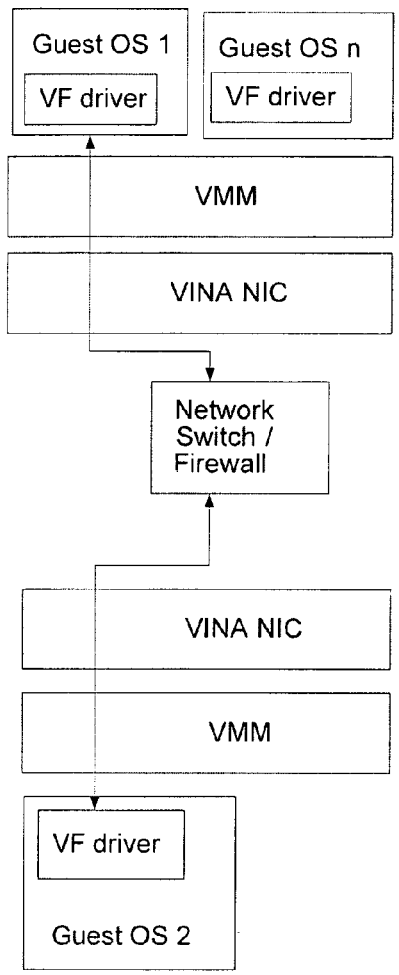
FIG. 9 is a block diagram of another electronic system in accordance with some embodiments of the invention.
Figure 10:
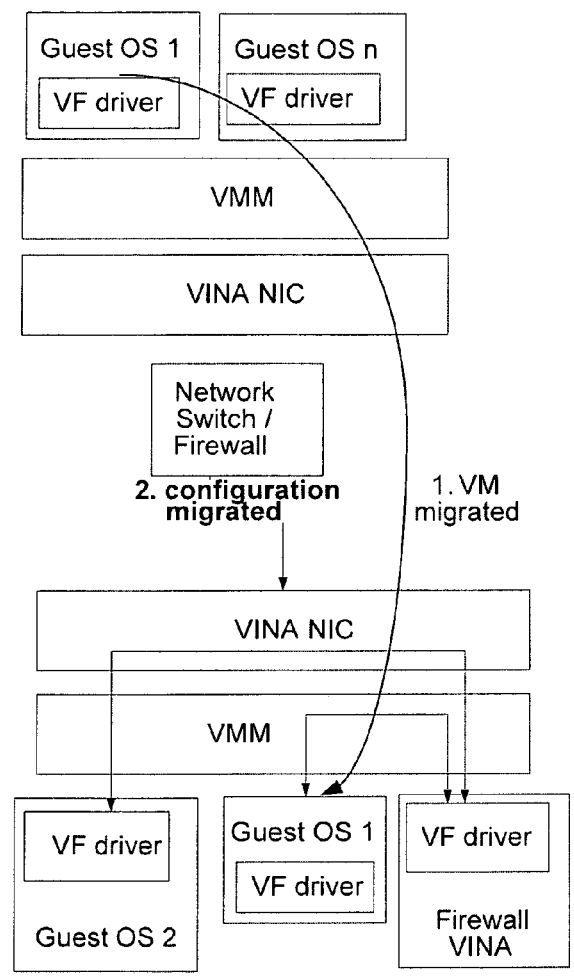
FIG. 10 is a block diagram of another electronic system in accordance with some embodiments of the invention.

With reference to FIGS. 9 and 10, in some embodiments of the invention an external switch (or physical appliance) may use the SMC interface to move VM-VM rules into the platform NIC when both communicating VMs are moved to the same platform. In the counter case, when a VINA VM is migrated to another platform, the SMC on the first platform may contact the SMC on the other platform to move the VINA filter subscription to the new NIC physical function, so that the traffic flows correctly as soon as the VINA VM is resumed on the destination platform.

Figure 11:
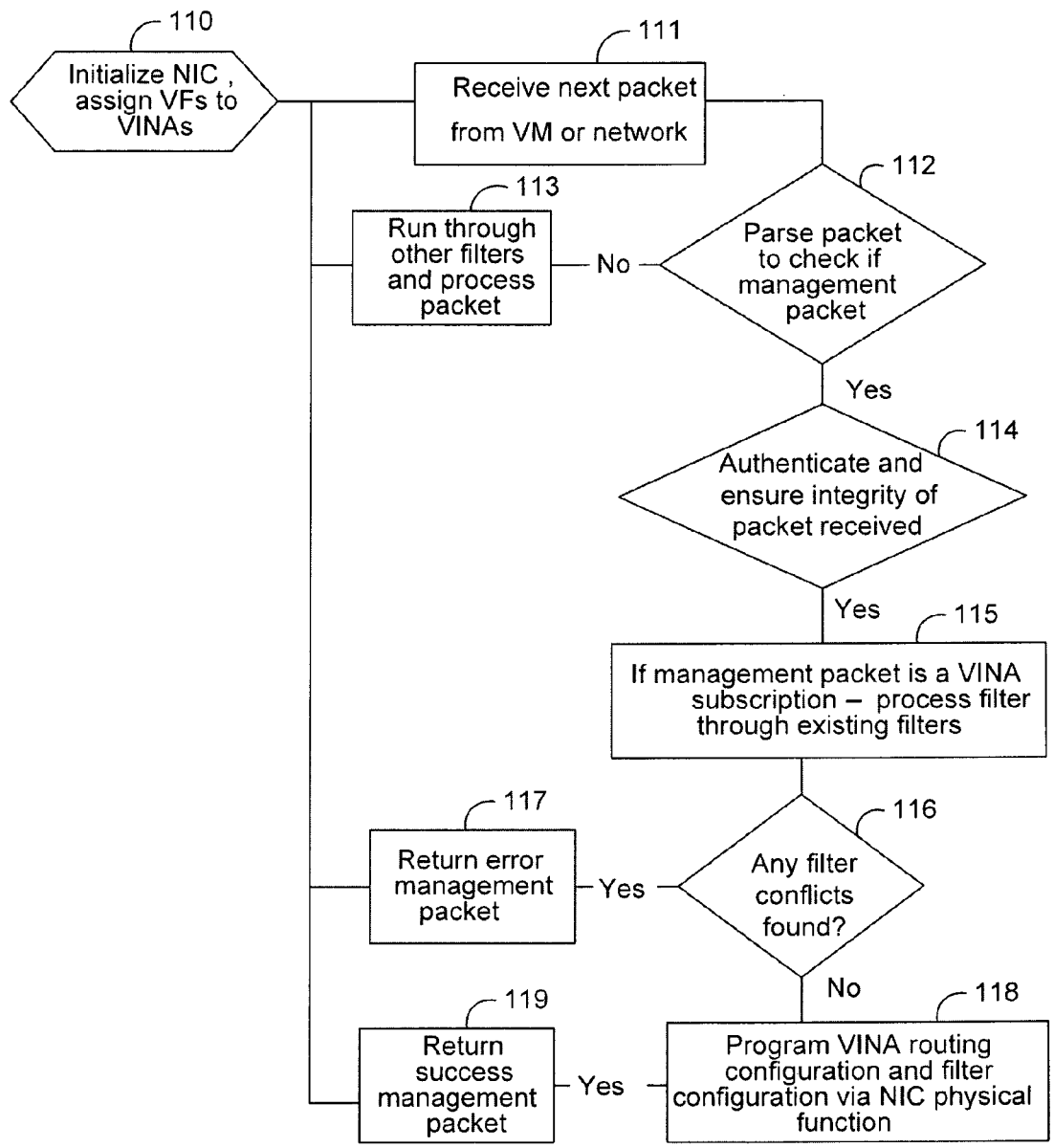
FIG. 11 is another flow diagram in accordance with some embodiments of the invention.

With reference to FIG. 11, some embodiments of the invention may involve initializing a NIC and assigning VFs to VINAs (e.g. at block 110). The SMC may receive a packet from the VM or the network (e.g. at block 111). The SMC may parse the packet to check if it is a management packet (e.g. at block 112). If not, the packet may be run through the NIC filters and otherwise processed by the NIC (e.g. at block 113). If the packet is a management packet, the SMC may authenticate and ensure the integrity of the packet received (e.g. at block 114). If the packet is authenticated successfully, the SMC may determine if the management packet is a VINA subscription and process the filter through the existing filters (e.g. at block 115). For example, the SMC may determine if any filter conflicts are found (e.g. at block 116). If conflicts are found, the SMC may return an error management packet (e.g. at block 117). If no conflicts are found, the SMC may program the VINA routing configuration and filter configuration via the NIC physical function (e.g. at block 118) and return a success management packet (e.g. at block 119).

Advantageously, some embodiments of the invention are less dependent on the VMM-provided interface, which may vary from one VMM vendor to another. Advantageously, some embodiments of the invention may be less vulnerable to attacks from malicious software as compared to the VMM software interface. For example, some embodiments of the invention may provide one or more of the following advantages: NIC capabilities may be exposed directly to the VINA VMs thus reducing any enabling required; the attack surface of the VMM may be reduced by isolating the NIC configuration functionality into a System Management Controller; improved network link usage by reducing traffic exchanged between platforms from spilling into the physical network without compromising inspection of this traffic; and/or simplifying migration of VINA VMs by using the SMC to pre-configure rules on the destination platform.

For example, some embodiments of the invention may ensure inter-VM traffic is inspected by the security appliances without requiring the VMM to expose any software configuration or filtering API. For example, some embodiments of the invention may provide direct configuration of routing traffic between VINAs when using an SR-IOV NIC using the SMC. For example, some embodiments of the invention may reduce link bandwidth required for migration by automatically moving switch configuration into the NIC when VINA VMs are migrated into the platform. For example, some embodiments of the invention may provide simple migration of VINA rules using SMC to SMC communication.

Although many of the embodiments described herein utilize terminology associated with particular environments, those skilled in the art will appreciate that the invention is not limited to these specific embodiments and that equivalent routines and/or structures may be implemented in other processor-based environments where security features are desired. For example, in some applications the System Management Controller (SMC) may be referred to as a Server Management Controller or a Server Manageability Controller, among other possible terminology. Likewise, the various components, controllers, virtual modules, protocols, and registers referred to herein may be described by other terminology in other platforms while providing equivalent structures and/or performing equivalent functions. Those skilled in the art will appreciate that, given the benefit of the present description, a numerous variety of other circuits and combinations of hardware and/or software may be configured to implement various methods, circuits, and systems in accordance with the embodiments described herein and other embodiments of the invention.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
   at least one processor;
   at least one memory coupled to the at least one processor;
   a network interface component;
   a management controller, and
   a plurality of virtual inline network appliances, wherein the management controller is configured to:
      receive subscription requests from the plurality of virtual inline network appliances, wherein the virtual network appliances directly issue the subscription requests;
      generate a filter configuration for the network interface component based on all the subscription requests received from the plurality of virtual inline network appliances; and
      apply the filter configuration to the network interface component.

2. A processor-based system, comprising:
   at least one processor;
   at least one memory coupled to the at least one processor;
   a network interface component; and
   a management controller, wherein the management controller is configured to:
      receive information related to a subscription request from a virtual machine;
      generate configuration information for the network interface component based on the subscription request; and
      provide the configuration information to the network interface component,
   wherein the network interface component includes a hardware mailbox and wherein the management controller provides the configuration information to the network interface component via the hardware mailbox.

3. The system of claim 2, wherein the management controller provides the configuration information to the network interface component via a network protocol.

4. A processor-based system, comprising:
   at least one processor;
   at least one memory coupled to the at least one processor;
   a network interface component; and
   a management controller, wherein the management controller is configured to:
      receive information related to a subscription request from a virtual machine;
      generate configuration information for the network interface component based on the subscription request; and
      provide the configuration information to the network interface component,
   wherein a subscription request corresponds to a configuration bit set for a virtual function configuration and the configuration bit is set by a basic input output system.

5. A processor-based system, comprising:
   at least one processor;
   at least one memory coupled to the at least one processor;
   a network interface component; and
   a management controller, wherein the management controller is configured to:
      receive information related to a subscription request from a virtual machine;
      generate configuration information for the network interface component based on the subscription request; and
      provide the configuration information to the network interface component,
   wherein the management controller is further configured to:
      migrate information related to the configuration of the network interface component if the virtual machine is moved.

6. The system of claim 5, wherein the migration is performed in response to a signal from an external switch.

7. A management controller, comprising:
   a controller and code, wherein when the code is executed by the controller the management controller is configured to:
      receive subscription requests from a plurality of virtual inline network appliances, wherein the virtual inline network appliances directly issue the subscription requests;
      generate a filter configuration for the network interface component based on all the subscription requests received from the plurality of virtual inline network appliances; and
      apply the filter configuration to the network interface component.

8. A management controller, comprising:
   a controller and code, wherein when the code is executed by the controller the management controller is configured to:
      receive information related to a subscription request from a virtual machine;
      generate configuration information for a network interface component based on the subscription request; and
      provide the configuration information to the network interface component,
   wherein the network interface component includes a hardware mailbox and wherein the management controller provides the configuration information to the network interface component via the hardware mailbox.

9. The management controller of claim 8, wherein the management controller provides the configuration information to the network interface component via a network protocol.

10. A management controller, comprising:
a controller and code, wherein when the code is executed by the controller the management controller is configured to:
receive information related to a subscription request from a virtual machine;
generate configuration information for a network interface component based on the subscription request; and
provide the configuration information to the network interface component,
wherein a subscription request corresponds to a configuration bit set for a virtual function configuration and the configuration bit is set by a basic input output system.

11. The A management controller, comprising:
a controller and code, wherein when the code is executed by the controller the management controller is configured to:
receive information related to a subscription request from a virtual machine;
generate configuration information for a network interface component based on the subscription request; and
provide the configuration information to the network interface component,
wherein the management controller is further configured to:
migrate information related to the configuration of the network interface component if the virtual machine is moved.

12. The management controller of claim 11, wherein the migration is performed in response to a signal from an external switch.

13. A method of managing subscription requests for a network interface component, comprising:
receiving subscription requests from a plurality of virtual inline network appliances at a management controller;
generating a filter configuration for the network interface component at the management controller based on all the subscription requests received from the plurality of virtual inline network appliances; and
applying the filter configuration to the network interface component.

14. A method of managing subscription requests for a network interface component, comprising:
receiving information related to a subscription request from a virtual machine at a management controller;
generating configuration information for the network interface component at the management controller, based on the subscription request; and
providing the configuration information from the management controller to the network interface component,
wherein the network interface component includes a hardware mailbox and wherein providing the configuration information from the management controller to the network interface component comprises:
providing the configuration information from the management controller to the network interface component via the hardware mailbox.

15. The method of claim 14, wherein providing the configuration information from the management controller to the network interface component comprises:
providing the configuration information from the management controller to the network interface component via a network protocol.

16. A method of managing subscription requests for a network interface component, comprising:
receiving information related to a subscription request from a virtual machine at a management controller;
generating configuration information for the network interface component at the management controller, based on the subscription request; and
providing the configuration information from the management controller to the network interface component,
wherein a subscription request corresponds to a configuration bit set for a virtual function configuration and the configuration bit is set by a basic input output system.

17. A method of managing subscription requests for a network interface component, comprising:
receiving information related to a subscription request from a virtual machine at a management controller;
generating configuration information for the network interface component at the management controller, based on the subscription request;
providing the configuration information from the management controller to the network interface component; and
migrating information related to the configuration of the network interface component if the virtual machine is moved.

18. The method of claim 17, wherein migrating information related to the configuration of the network interface component comprises:
migrating information related to the configuration of the network interface component in response to a signal from an external switch.

* * * * *